United States Patent
Chaganti et al.

(10) Patent No.: US 8,473,965 B2
(45) Date of Patent: Jun. 25, 2013

(54) NET-TIMER DAEMON

(75) Inventors: Sivarami R. Chaganti, Bangalore (IN); Uma M. Chandolu, Bangalore (IN); Nikhil Hegde, Austin, TX (US); Puneet Mahajan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 530 days.

(21) Appl. No.: 12/764,312

(22) Filed: Apr. 21, 2010

(65) Prior Publication Data

US 2011/0265101 A1    Oct. 27, 2011

(51) Int. Cl.
*G06F 13/00*    (2006.01)

(52) U.S. Cl.
USPC .......................................... 719/310; 713/502

(58) Field of Classification Search
USPC .......................................... 719/310; 713/502
See application file for complete search history.

(56) References Cited

U.S. PATENT DOCUMENTS

| | | | |
|---|---|---|---|
| 6,718,479 B1 * | 4/2004 | Christenson | 713/502 |
| 6,766,519 B1 | 7/2004 | Burriss et al. | |
| 7,043,525 B2 * | 5/2006 | Tuttle et al. | 709/203 |
| 7,050,940 B2 | 5/2006 | Basso et al. | |
| 7,277,917 B2 * | 10/2007 | Tuttle et al. | 709/203 |
| 7,324,558 B2 | 1/2008 | Schaller | |
| 7,383,460 B2 * | 6/2008 | Sherwin et al. | 713/600 |
| 7,461,283 B2 | 12/2008 | Andrianov | |
| 7,930,362 B2 * | 4/2011 | Rumelhart | 709/217 |
| 8,250,586 B2 * | 8/2012 | Nelson | 719/312 |
| 2005/0060427 A1 * | 3/2005 | Phillips et al. | 709/238 |
| 2007/0050519 A1 * | 3/2007 | Cano et al. | 709/238 |
| 2010/0042866 A1 | 2/2010 | Shih | |

* cited by examiner

*Primary Examiner* — Andy Ho
(74) *Attorney, Agent, or Firm* — Yee & Associates, P.C.; David A. Mims, Jr.

(57) ABSTRACT

User space applications can utilize custom network protocol timers. A registration request is received from an application to register a custom timer. Responsive to receiving the registration request, a handle is created. The handle is a pointer to be used by the application to reference the custom timer. The handle is forwarded to the application. When a custom timer is required, a request to use a custom timer is received from an application. The kernel is then requested to start the custom timer. A determination is then made as to whether a receipt confirmation is received from the kernel before expiration of the custom timer.

15 Claims, 5 Drawing Sheets

NET-TIMER DAEMON

BACKGROUND

1. Field

The disclosure relates generally to a computer implemented method, a computer program product accessible from a computer-usable or computer-readable medium, and a data processing system. More specifically, the disclosure relates to a computer implemented method, a computer program product accessible from a computer-usable or computer-readable medium, and a data processing system for creating custom timers through the use of a net-timer daemon.

2. Description of the Related Art

The Internet, also referred to as an "internetwork", is a set of computer networks, possibly dissimilar, joined together by means of gateways that handle data transfer and the conversion of messages from a protocol of the sending network to a protocol used by the receiving network. When capitalized, the term "Internet" refers to the collection of networks and gateways that use the TCP/IP suite of protocols. The Internet may carry information and provide services. The information and services include, for example, electronic mail, online chat services, file transfers, web pages, and other resources.

The availability of an accurate and fine-grained timer service is crucial to the efficient implementation of many networking protocols. Timers are used to determine when "timeouts" occur, i.e., when a timer expires, indicating that a predetermined amount of time has passed and that therefore an action or computer function should be performed. For example, a response timeout occurs when no response from a sought device is received over the network within a predetermined amount of time after sending a request. The occurrence of a timeout can indicate to a device that it should stop waiting for a response, retransmit data, sever a connection to another device on the network, or perform one or more other functions.

Typically in a networking system, each connection of a reliable network protocol maintains several active timers to keep track of different timeouts supported by the protocol. In such protocols, multiple timers are maintained for each particular network connection to control the state of the connection based on predetermined conditions. For example, in the Transmission Control Protocol (TCP), one timer can be a retransmission timer that keeps track of the time elapsed after a request or data is transmitted to a connected device and before an acknowledgement is received from the connected device, so that the sending device can retransmit information if a timeout occurs. An idle timer can keep track of the time since any data frame or signal was last received on a particular connection, such that if an idle or "stale" timeout occurs, the connection can be shut down due to lack of activity. A keepalive timer can be started after an idle timeout occurs to keep track of the time elapsed since sending a test signal to test if the other computer system is still functioning and connected, so that if a timeout occurs before any response is received, the other computer system is considered non-functioning, or non-communicative. An acknowledgement delay timer can count down a predetermined duration of time after receiving a packet of data, thereby causing a delay for acknowledging the reception of the packet so that a single acknowledgement can be later sent after receiving multiple close-together packets, thus promoting a reduction in the amount of unnecessary acknowledgments. All these timers can be maintained for each network connection. For example, networking functions like server load balancing and layer-4 protocol termination require such multiple timers to be maintained per connection of the subject device to another device over the network.

Setting, resetting, and expiration of these timers is typically supported and maintained by a system timer task or service. In many conventional systems, a counter is maintained for each connection timer associated with each connection, the counters being stored in a memory control block associated with each connection in a connection table. The timer task periodically examines the entries of the entire connection table and decrements all the counters for the active connections. For example, the timer task may periodically examine the entries of the connection table every 500 milliseconds. A timeout is declared when the value of a counter becomes zero. This method requires several memory-related accesses per connection, such as acquiring a lock to the connection control block so that other tasks may not access the block, a read of the counter value, write to decrement the counter value, and an unlock operation to free the control block for other tasks.

Most information technology companies are heavily dependent on the efficient exchange of information between machines in the local intranet and with the internet in general. Tuning of the networking parameters becomes a very critical part of maintaining this high efficiency. Different operating systems allow varying degrees of flexibility to cater for the differing requirements of applications.

Most operating systems, including AIX®, allow tuning of various TCP/IP related timers on a system wide and sometimes on a per connection basis. AIX® is a registered trademark of International Business Machines, Inc. In AIX®, the global values are set using the "no" command. If an individual application needs to set a timer value to something other than the system-wide value, then operating systems typically give the option of setting it programmatically using "socket options". However, this is only feasible if the user has access to the source code of the application and can modify it at will.

SUMMARY

According to one embodiment of the present invention, a computer implemented method avails applications' use of custom network protocol timers. A registration request is received from an application to register a custom timer. Responsive to receiving the registration request, a handle is created. The handle is a pointer to be used by the application to reference the custom timer. The handle is forwarded to the application.

When a custom timer is required, a request to use a custom timer is received from an application. The kernel is then requested to start the custom timer. A determination is then made as to whether a receipt confirmation is received from the kernel before expiration of the custom timer.

DETAILED DESCRIPTION

Figure 1:
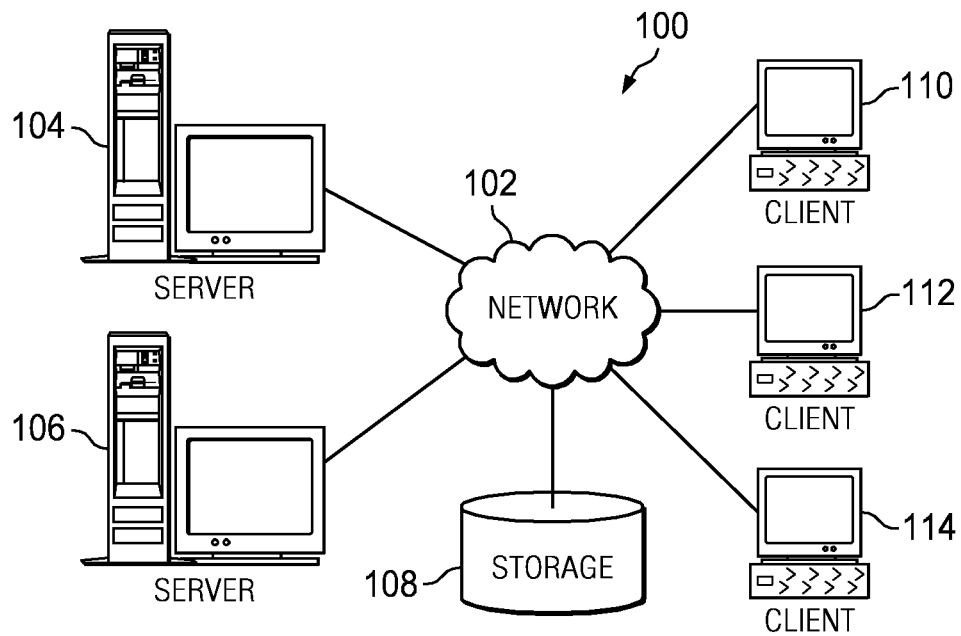
FIG. 1 is a pictorial representation of a network of data processing systems in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable-medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by, or in connection with, the instruction execution system, apparatus, or device. The computer-usable medium may include a propagated data signal with the computer-usable program code embodied therewith, either in baseband or as part of a carrier wave. The computer-usable program code may be transmitted using any appropriate medium, including, but not limited to, wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures, and in particular with reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communication links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Figure 2:
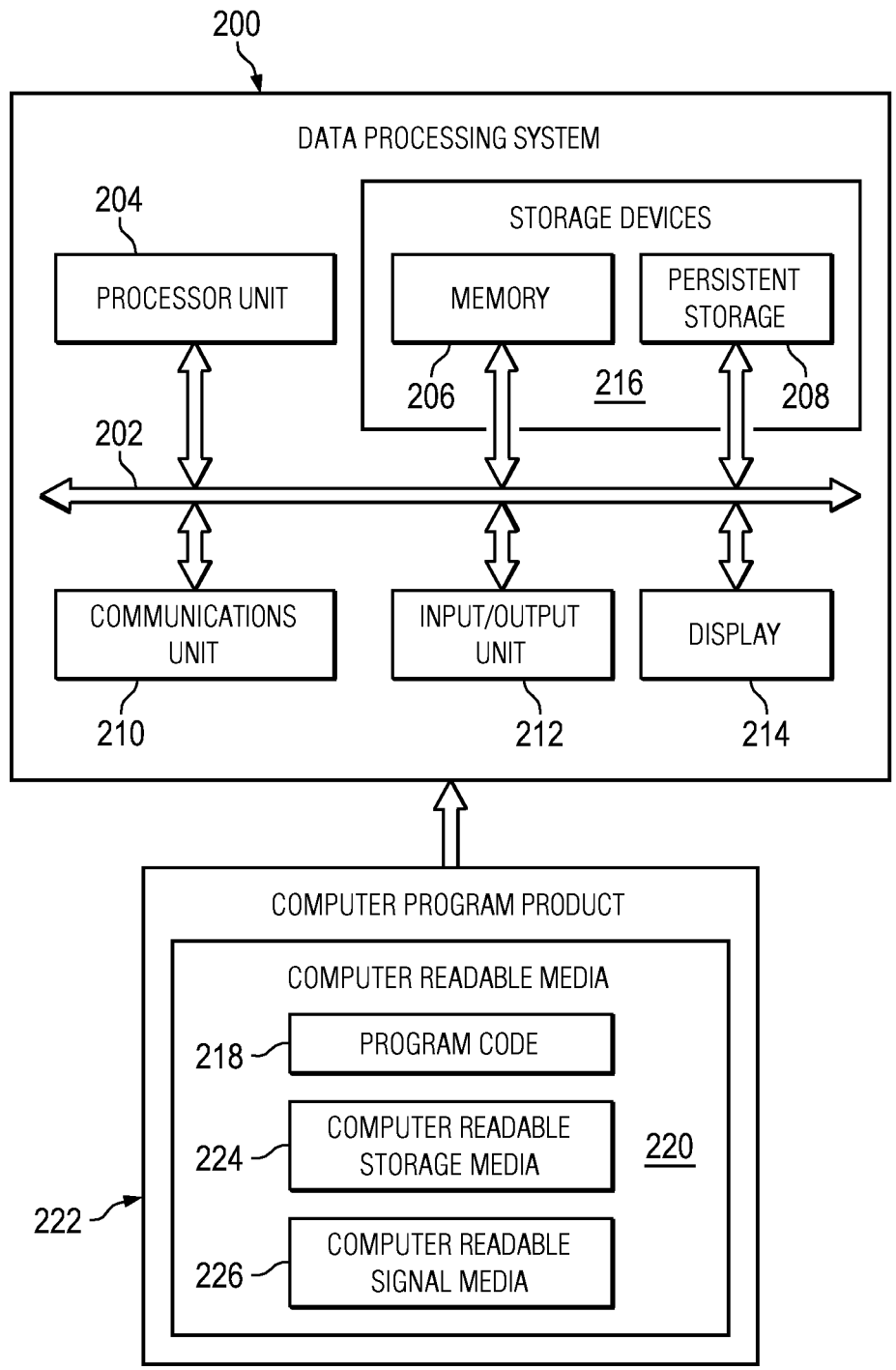
FIG. 2 is a diagram of a data processing system depicted in accordance with an illustrative embodiment.

Turning now to FIG. 2, a diagram of a data processing system is depicted in accordance with an illustrative embodiment. In this illustrative example, data processing system 200 includes communications fabric 202, which provides communications between processor unit 204, memory 206, persistent storage 208, communications unit 210, input/output (I/O) unit 212, and display 214. Data processing system 200 can be, for example, server computer 104, server computer 106, or client computers 110, 112, and 114 of FIG. 1.

Processor unit 204 serves to execute instructions for software that may be loaded into memory 206. Processor unit 204 may be a number of processors, may be a multi-processor core, or some other type of processor, depending on the particular implementation. A number as used herein with reference to an item means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communication links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, compute-usable program code, or computer-readable program code that may be read and executed by a processor in processor unit 204. The program code in the different embodiments may be embodied on different physical or computer-readable storage media, such as memory 206 or persistent storage 208.

Program code 218 is located in a functional form on computer readable media 220 that is selectively removable and may be loaded onto, or transferred to, data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200. In these illustrative examples, computer readable storage media 224 is a non-transitory computer-readable storage medium.

Alternatively, program code 218 may be transferred to data processing system 200 using computer readable signal media 226. Computer readable signal media 226 may be, for example, a propagated data signal containing program code 218. For example computer readable signal media 226 may be an electro-magnetic signal, an optical signal, and/or any other suitable type of signal. These signals may be transmitted over communication links, such as wireless communication links, optical fiber cable, coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208 and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
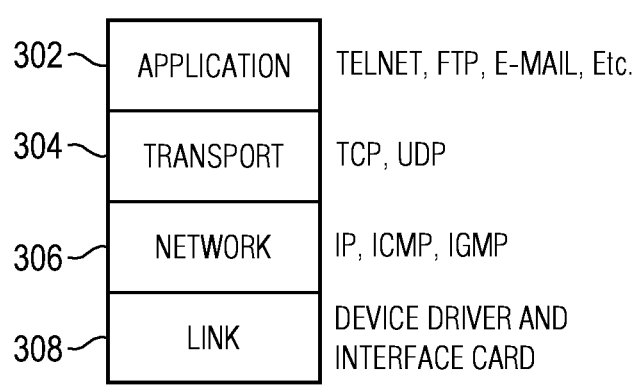
FIG. 3 is a diagram of a transmission control protocol/Internet protocol (TCP/IP) and similar protocols depicted in accordance with an illustrative embodiment.

Referring now to FIG. 3, a diagram of a transmission control protocol/Internet protocol (TCP/IP) and similar protocols depicted in accordance with an illustrative embodiment. TCP/IP and similar protocols are utilized by communications architecture 300. In this example, communications architecture 300 is a 4-layer system. This architecture includes application layer 302, transport layer 304, network layer 306, and link layer 308. Each layer is responsible for handling various communications tasks. Link layer 308 also is referred to as the data-link layer or the network interface layer and normally includes the device driver in the operating system and the corresponding network interface card in the computer. This layer handles all the hardware details of physically interfacing with the network media being used, such as optical cables or Ethernet cables.

Network layer 306 also is referred to as the Internet layer and handles the movement of packets of data around the network. For example, network layer 306 handles the routing of various packets of data that are transferred over the network. Network layer 306 in the TCP/IP suite is comprised of several protocols, including Internet protocol (IP), Internet control message protocol (ICMP), and Internet group management protocol (IGMP).

Next, transport layer 304 provides an interface between network layer 306 and application layer 302 that facilitates the transfer of data between two host computers. Transport layer 304 is concerned with things such as, for example, dividing the data passed to it from the application into appropriately sized chunks for the network layer below, acknowledging received packets, and setting timeouts to make certain the other end acknowledges packets that are sent. In the TCP/IP protocol suite, two distinctly different transport protocols are present, TCP and User datagram protocol (UDP).

TCP provides reliability services to ensure that data is properly transmitted between two hosts, including dropout detection and retransmission services.

Conversely, UDP provides a much simpler service to the application layer by merely sending packets of data called datagrams from one host to the other, without providing any mechanism for guaranteeing that the data is properly transferred. When using UDP, the application layer must perform the reliability functionality.

Application layer 302 handles the details of the particular application. Many common TCP/IP applications are present for almost every implementation, including a Telnet for remote login; a file transfer protocol (FTP); a simple mail transfer protocol (SMTP) for electronic mail; and a simple network management protocol (SNMP).

The illustrative embodiments recognize and take into account a number of considerations. For example, the illustrative embodiments recognize and take into account that no mechanisms are currently preset that allow an application to choose a specific value for a timer without having to modify the application itself or the system-wide setting. Thus, an illustrative embodiment of the present invention introduces an intermediate net-timer daemon to handle time out values for all applications. The net-timer daemon will operate in user space on one hand to interface with the applications wishing to avail its services, and with kernel space on the other hand to inter-operate with the TCP/IP kernel (extension).

According to an illustrative embodiment herein, a computer implemented method is provided for availing applications' use of custom network protocol timers. A registration request is received from an application to register a custom timer. Responsive to receiving the registration request, a handle is created. The handle is a pointer to be used by the application to reference the custom timer. The handle is forwarded to the application.

When a custom timer is required, a request to use a custom timer is received from an application. The kernel is then requested to start the custom timer. A determination is then made as to whether a receipt confirmation is received from the kernel before expiration of the custom timer.

Figure 4:
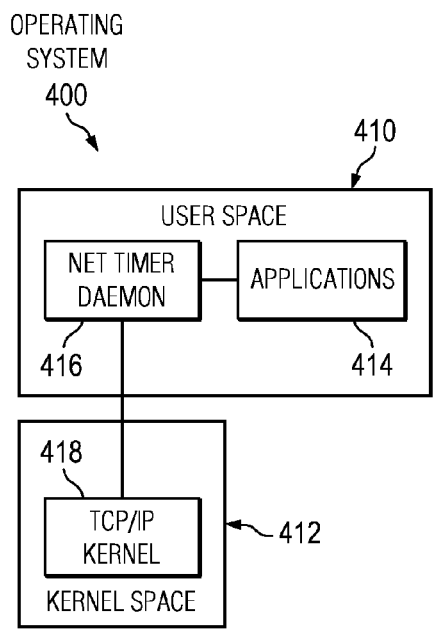
FIG. 4 is a an operating system executing on a data processing system in accordance with an illustrative embodiment.

Referring now to FIG. 4, an operating system executing on a data processing system, such as one of server computer 104 and server computer 106 of FIG. 1, or one of client computers 110, 112, and 114 of FIG. 1. Operating system 400 provides an interface between hardware and user, which is responsible for the management and coordination of activities and the sharing of the resources of a computer, that acts as a host for applications run on the data processing system.

Operating system 400 is divided into user space 410, and kernel space 412. User space 410 is a segregation of virtual memory of operating system 400 reserved for the execution of applications 414. Applications 414 are any programs, such as a web server, an e-mail application, or a web browser, that exchange information over an attached network, such as network 102 of FIG. 1.

Net timer daemon 416 is a program running in user space 410 that responds to timer registration requests by applications 414. When one of applications 414 wants to register or rest a custom TCP/IP timer, the application sends a timer registration request to net timer daemon 416. Net timer daemon 416 registers the request and returns a handle to the requesting application. Applications 414 then uses the handle to request network-related timer settings that are less than the corresponding system timer settings.

Kernel space 412 is a segregation of virtual memory of operating system 400. Kernel space 412 is reserved for running the kernel, kernel extensions, and some device drivers.

Kernel space 412 includes TCP/IP kernel 418. TCP/IP kernel 418 is the part of operating system 400 that implements the TCP/IP protocol.

Figure 5:
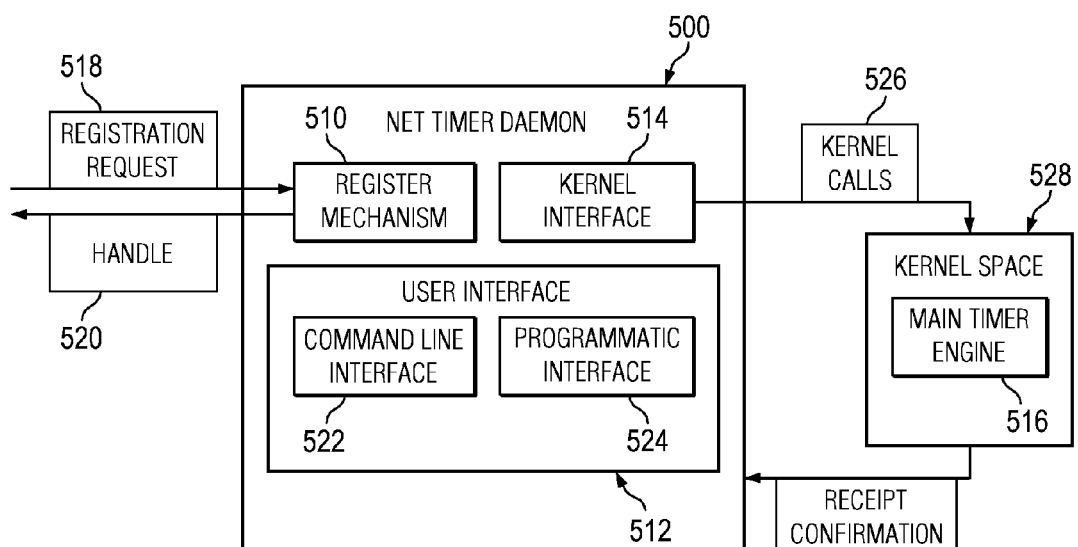
FIG. 5 is an illustrative diagram of a net timer daemon in which illustrative embodiments may be implemented.

Referring now to FIG. 5, an illustrative diagram of a net timer daemon is provided in which illustrative embodiments may be implemented. Net timer daemon 500 is net timer daemon 416 of FIG. 4.

Net timer daemon 500 provides a mechanism that allows applications to choose specific values for TCP/IP related timers without having to modify the applications themselves, or the system-wide timer settings. Net timer daemon 500 includes register mechanism 510, user interface 512, and kernel interface 514.

Register mechanism 510 is a software portion of net timer daemon 500 that allows applications, such as applications 414 of FIG. 4, to register themselves with net timer daemon 500 in order to take advantage of the custom TCP/IP timers of the net timer daemon 500. Register mechanism 510 receives registration request 518 from an application. Registration request 518 is a request by an application executing in user space to register a custom TCP/IP timer with the net timer daemon 500.

Register mechanism 510 returns handle 520 to the application in response to receiving registration request 518. Handle 520 is a particular kind of smart pointer that is used by the application to reference the custom TCP/IP timer managed main timer engine 516.

User interface 512 is a software interface by which a user can interact with net timer daemon 500. In one illustrative embodiment, user interface 512 includes command line interface 522 and programmatic interface 524. Command line interface 522 is a user interface that provides a mechanism for a user to enter commands into programmatic interface 524. The commands can include, for example, but not limited to, a specification of custom net timer durations. While command line interface 522 is described, other interfaces, such as graphical user interfaces and text user interfaces could also be implemented.

Programmatic interface 524 is an application programming interface implemented by net timer daemon 500. Programmatic interface 524 enables interaction between applications, such as applications 414 of FIG. 4, and main timer engine 516. Programmatic interface 524 allows net timer daemon 500 to implement an operating system independent interface having a common programmatic and command line interface. This common programmatic and command line interface renders net timer daemon 500 easily portable across, and implementable on, a variety of dissimilar operating systems. Net timer daemon 500 therefore provides an interface for registering custom TCP/IP timers that is not reliant on calling socket option ioctls.

Kernel interface 514 is an interface between net timer daemon 500 and the kernel space, such as kernel space 412 of FIG. 4. Kernel interface 514 makes kernel calls 526 to the kernel space, and specifically to the TCP/IP kernel, such as TCP/IP kernel 418, on behalf of applications, such as applications 414 of FIG. 4.

Main timer engine 516 is a software portion of net timer daemon 500 that resides inside kernel space 528. Kernel space 528 is kernel space 412 of FIG. 4. Main timer engine 516 maintains custom TCP/IP timers for each of the applications that register with net timer daemon 500. Net timer daemon 500 communicates with the kernel to setup the required timers. When the kernel receives confirmation of packet receipt by a recipient, main timer engine 516 forwards receipt confirmation 530 to net timer daemon 500.

Figure 6:
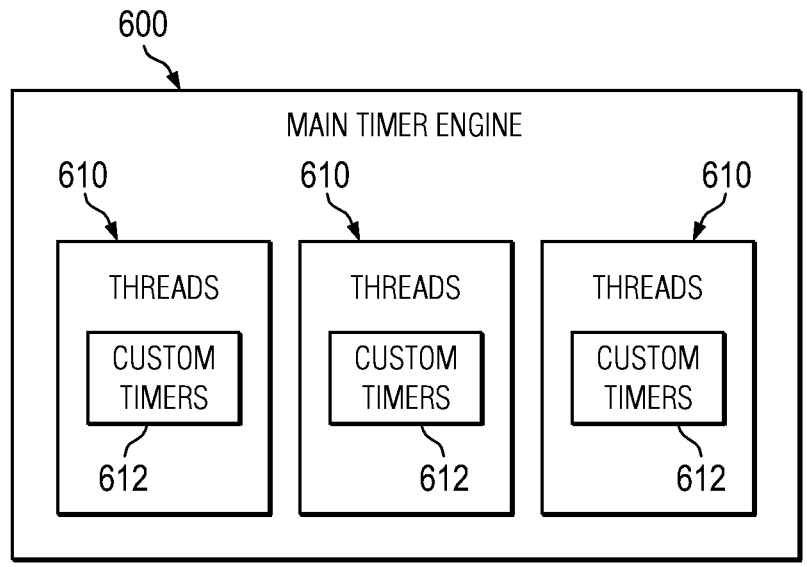
FIG. 6 is an illustrative diagram of a main timer engine in which illustrative embodiments may be implemented.

Referring now to FIG. 6, an illustrative diagram of a main timer engine is provided in which illustrative embodiments may be implemented. Main timer engine 600 is main timer engine 516 of FIG. 5.

Main timer engine 600 maintains threads 610. Each of threads 610 correspond to a single registered application, such as applications 414 of FIG. 4. Each of threads 610 executes one of custom timers 612. Each of custom timers 612 has a duration specified by its corresponding registered application. When a registered application sends a data packet or otherwise requires the use of a timer, the registered application requests the timer through its handle, such as handle 520 of FIG. 5. Main timer engine then starts one of custom timers 612 in the corresponding one of threads 610. At the expiration of the custom timer, main timer engine 600 notifies the kernel interface, such as kernel interface 514 of FIG. 5, of the expiration of the one of custom timers 612. The kernel interface then makes a kernel call to the TCP/IP kernel, such as TCP/IP kernel 418 of FIG. 4. The TCP/IP kernel can then make any necessary kernel functions in response to the expiration, such as, but not limited to, resending of the data packet.

Figure 7:
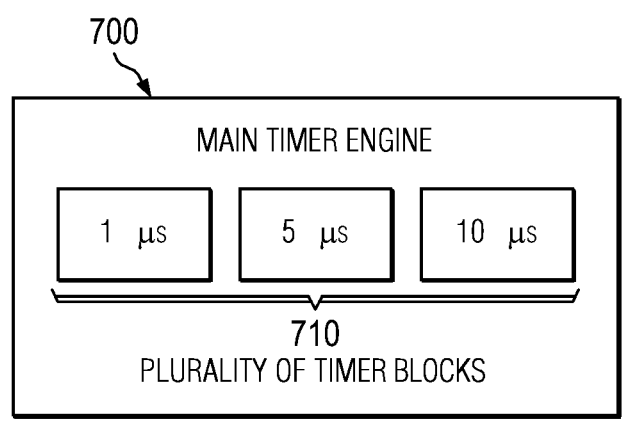
FIG. 7 is an illustrative diagram of a main timer engine in which illustrative embodiments may be implemented.

Referring now to FIG. 7, an illustrative diagram of a main timer engine is provided in which illustrative embodiments may be implemented. Main timer engine 700 is main timer engine 516 of FIG. 5. Main timer engine 700 is an alternative embodiment of main timer engine 600 of FIG. 6.

Main timer engine 700 includes plurality of timer blocks 710. Each of plurality of timer blocks 710 is for a different predetermined duration. When a registered application sends a data packet or otherwise requires the use of a timer, the registered application requests the timer through its handle, such as handle 520 of FIG. 5. Main timer engine then assembles ones of the plurality of timer blocks 710 to execute sequentially such that the total duration of the assembled ones of the plurality of timer blocks 710 is equal to the custom TCP/IP timer for the requesting application. At the expiration of the custom timer, main timer engine 700 notifies the kernel interface, such as kernel interface 514 of FIG. 5, of the expiration of the one of custom timers 612 as in FIG. 6. The kernel interface then makes a kernel call to the TCP/IP kernel, such as TCP/IP kernel 418 of FIG. 4 The TCP/IP kernel can then make any necessary kernel functions in response to the expiration, such as, but not limited to, resending of the data packet.

Figure 8:
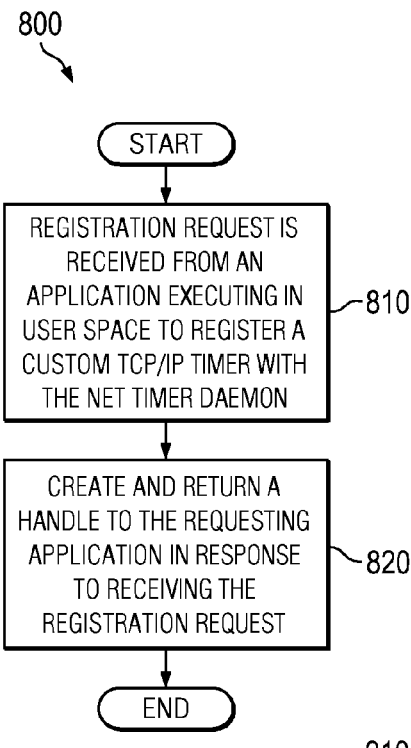
FIG. 8 is a flowchart for registering applications with a net timer daemon, in accordance with an illustrative embodiment.

Referring now to FIG. 8, a flowchart illustrating registering applications with a net timer daemon is shown according to an illustrative embodiment. Process 800 is a software process, executing on a software component, such as net timer daemon 500 of FIG. 5.

Process 800 begins when a registration request is received from an application executing in user space to register a custom TCP/IP timer with the net timer daemon (Step 810). The registration request can be registration request 518 of FIG. 5.

Responsive to receiving the registration request, process 800 creates and returns a handle to the requesting application (step 820), with the process terminating thereafter. The handle is a particular kind of smart pointer that is used by the requesting application to reference the custom TCP/IP timer managed by the net timer daemon. The handle can be handle 520 of FIG. 5. Once registered, the registered applications can then use the handle to request network-related timer settings that are less than the corresponding system timer settings.

Figure 9:
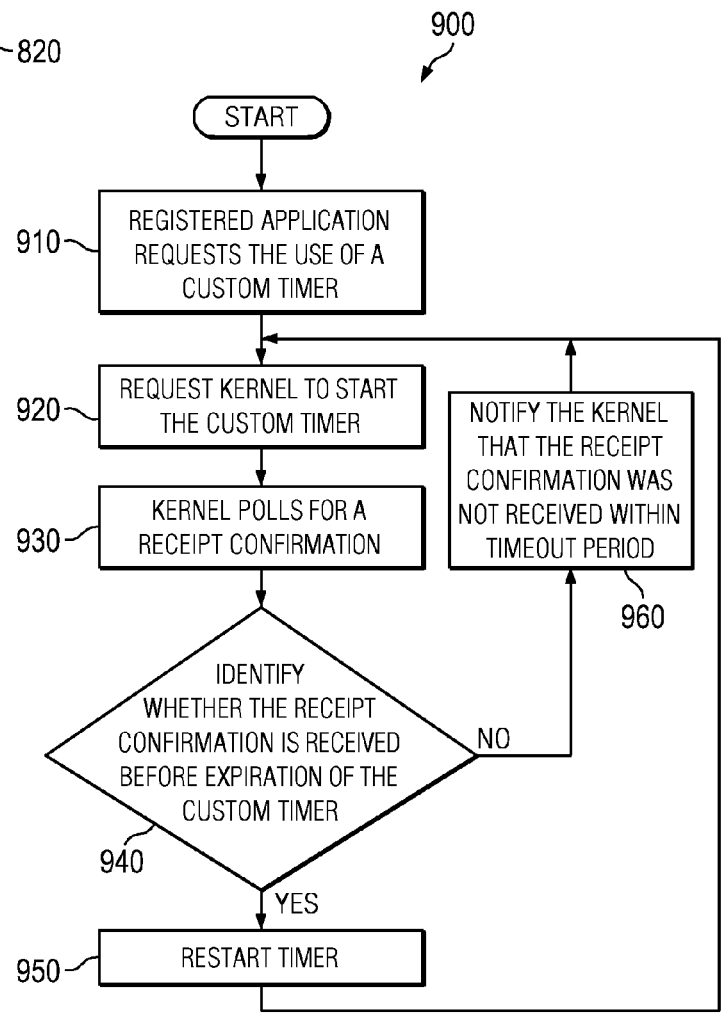
FIG. 9 is a flowchart illustrating a process for setting and executing a custom timer is shown according to an illustrative embodiment.

Referring now to FIG. 9, a flowchart illustrating a process for setting and executing a custom timer is shown according to an illustrative embodiment. Process 900 is a software process, executing on a software component, such as net timer daemon 500 of FIG. 5.

Process 900 begins when a registered application requests the use of a custom timer (step 910). Registered applications can request the use of the custom timer by referencing the timer through the handle created for the application, such as handle 520 of FIG. 5. A registered application may request or require the use of a custom timer when, for example, the application sends a data packet.

Process 900 then requests the kernel to start the custom timer (step 920). The kernel then polls for a receipt confirmation (step 930). Process 900 identifies whether the receipt confirmation is received before expiration of the custom timer (step 940).

Responsive to receiving the receipt confirmation prior to expiration of the custom timer ("yes" at step 940), the process then restarts the custom timer (step 950). Process 900 then iterates back to step 920 for restarting the custom timer.

Returning now to step 940, responsive to not receiving the receipt confirmation prior to expiration of the custom timer ("no" at step 940), process 900 notifies the kernel that the receipt confirmation was not received within the timeout period (step 960). Process 900 can notify the kernel through a kernel interface, such as kernel interface 514 of FIG. 5, of the expiration of the one of custom timers 612 of FIG. 6. The kernel interface then makes a kernel call to the TCP/IP kernel, such as TCP/IP kernel 418 of FIG. 4. The TCP/IP kernel can then make any necessary kernel functions in response to the expiration, such as, but not limited to, resending of the data packet. Process 900 then iterates back to step 920 for restarting the custom timer.

Thus the illustrative embodiment herein provide a computer implemented method for availing applications' use of custom network protocol timers. A registration request is received from an application to register a custom timer. Responsive to receiving the registration request, a handle is created. The handle is a pointer to be used by the application to reference the custom timer. The handle is forwarded to the application.

When a custom timer is required, a request to use a custom timer is received from an application. The kernel is then requested to start the custom timer. A determination is then made as to whether a receipt confirmation is received from the kernel before expiration of the custom timer.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by, or in connection with, the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for executing a custom timer, the computer implemented method comprising the computer implemented steps of:
    receiving a request to use of a custom timer;
    requesting a kernel to start the custom timer;
    identifying whether a receipt confirmation is received from the kernel before expiration of the custom timer; and
    responsive to not receiving the receipt confirmation prior to expiration of the custom timer, notifying the kernel that the receipt confirmation was not received before expiration of the custom timer.

2. The computer implemented method of claim 1, wherein the step of receiving the request to use the custom timer further comprises:
    receiving the request at a net timer daemon from an application in user space to use a custom transmission control protocol/internet protocol timer, wherein the request includes a handle referencing the custom transmission control protocol/internet protocol timer.

3. The computer implemented method of claim 2, wherein the net timer daemon further comprises a register mechanism, a kernel interface, and a user interface, wherein the step of requesting the kernel to start the custom timer further comprises:
    making a kernel call by the kernel interface to a transmission control protocol/internet protocol kernel within a kernel space, wherein the kernel call includes the handle.

4. The computer implemented method of claim 3, wherein the handle references a main timer engine residing in kernel space, wherein the main timer engine maintains the custom transmission control protocol/internet protocol timer for applications that register with the net timer daemon.

5. The computer implemented method of claim 1 further comprising:
    sending a data packet by an application, wherein the application is in user space; and
    responsive to sending the data packet, sending the request to use the custom timer by the application to the net timer daemon.

6. A computer readable storage medium having a computer program product for executing a custom timer encoded thereon, the computer program product comprising:
    instructions for receiving a request to use of a custom timer;
    instructions for requesting a kernel to start the custom timer;
    instructions for identifying whether the receipt confirmation is received from the kernel before expiration of the custom timer: and
    instructions, responsive to not receiving the receipt confirmation prior to expiration of the custom timer, for notifying the kernel that the receipt confirmation was not received before expiration of the custom timer.

7. The non-transitory computer readable storage medium of claim 6, wherein the instructions for receiving the request to use the custom timer further comprises:
    instructions for receiving the request at a net timer daemon from an application in user space to use a custom transmission control protocol/internet protocol timer, wherein the request includes a handle referencing the custom transmission control protocol/internet protocol timer.

8. The non-transitory computer readable storage medium of claim 7, wherein the net timer daemon further comprises a register mechanism, a kernel interface, and a user interface, wherein the step of requesting the kernel to start the custom timer further comprises:
    making a kernel call by the kernel interface to a transmission control protocol/internet protocol kernel within a kernel space, wherein the kernel call includes the handle.

9. The non-transitory computer readable storage medium of claim 8, wherein the handle references a main timer engine residing in the kernel space, wherein the main timer engine maintains the custom transmission control protocol/internet protocol timer for applications that register with the net timer daemon.

10. The non-transitory computer readable storage medium of claim 6, the computer program product further comprising:
    instructions for sending a data packet by an application, wherein the application is in user space; and
    instructions for responsive to sending the data packet, sending the request to use the custom timer by the application to the net timer daemon.

11. A data processing system comprising:
    a storage device having computer usable instructions encoded thereon for executing a custom timer;
    a bus connecting the storage device to a processor; and
    the processor, wherein the processor executes the computer usable instructions to receive a request for use of a custom timer; to request a kernel to start the custom timer; to identify whether the receipt confirmation is received from the kernel before expiration of the custom timer: and responsive to not receiving the receipt confirmation prior to expiration of the custom timer, to notify the kernel that the receipt confirmation was not received before expiration of the custom timer.

12. The data processing system of claim 11, wherein the processor executing the computer usable instructions to receive the request to use the custom timer further comprises the processor executing the computer usable instructions:
    to receive the request at a net timer daemon from an application in user space to use a custom transmission control protocol/internet protocol timer, wherein the request includes a handle referencing the custom transmission control protocol/internet protocol timer.

13. The data processing system of claim 12, wherein the net timer daemon further comprises a register mechanism, a kernel interface, and a user interface, wherein the processor executing the computer usable instructions to request the kernel to start the custom timer further comprises the processor executing the computer usable instructions:
    to make a kernel call by the kernel interface to a transmission control protocol/internet protocol kernel within the kernel space, wherein the kernel call includes the handle.

14. The data processing system of claim 13, wherein the handle references a main timer engine residing in kernel space, wherein the main timer engine maintains the custom transmission control protocol/internet protocol timer for applications that register with the net timer daemon.

15. The data processing system of claim 11, wherein the processor further executes the computer usable instructions:

to send a data packet by an application, wherein the application is in user space; and responsive to sending the data packet, to send the request to use the custom timer by the application to the net timer daemon.

\* \* \* \* \*